US011159381B2

(12) United States Patent
O'Brien et al.

(10) Patent No.: US 11,159,381 B2
(45) Date of Patent: Oct. 26, 2021

(54) VERIFICATION OF SOFTWARE-DEFINED NETWORKING (SDN) POLICIES FOR SPECIFIC TOPOLOGIES

(71) Applicant: Oracle International Corporation, Redwood Shores, CA (US)

(72) Inventors: Henry John O'Brien, Indooroopilly (AU); Padmanabhan Krishnan, Brisbane (AU); Nathan Robert Albert Keynes, Kuraby (AU); Marius Portmann, Underwood (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/526,671

(22) Filed: Jul. 30, 2019

(65) Prior Publication Data

US 2021/0036926 A1 Feb. 4, 2021

(51) Int. Cl.
| | | |
|---|---|---|
| *H04L 12/24* | (2006.01) | |
| *H04L 12/705* | (2013.01) | |
| *H04L 12/741* | (2013.01) | |
| *H04L 12/751* | (2013.01) | |
| *H04L 12/707* | (2013.01) | |
| *H04W 28/02* | (2009.01) | |

(52) U.S. Cl.
CPC .......... *H04L 41/12* (2013.01); *H04L 41/0893* (2013.01); *H04L 41/145* (2013.01); *H04L 45/02* (2013.01); *H04L 45/18* (2013.01); *H04L 45/745* (2013.01)

(58) Field of Classification Search
CPC ......... H04L 41/12; H04L 45/18; H04L 45/02; H04L 41/0893; H04L 45/745; H04L 41/145; H04L 45/24; H04W 28/02
See application file for complete search history.

(56) References Cited

U.S. PATENT DOCUMENTS 9,660,886 B1 * 5/2017 Ye .................... H04L 43/0823
2018/0018253 A1 * 1/2018 Malton ............... G06F 11/3608

OTHER PUBLICATIONS

Aryan, R. et al., "A General Formalism for Defining and Detecting OpenFlow Rule Anomalies", in 2017 IEEE 42nd Conference on Local Computer Networks (LCN), Oct. 2017, pp. 426-434 (9 pages).

Khurshid, A. et al., "Veriflow: Verifying Network-wide Invariants in Real Time", SIGCOMM Comput. Commun. Rev., vol. 42, No. 4, pp. 467-472, Sep. 2012 (6 pages).

(Continued)

*Primary Examiner* — Moo Jeong
(74) *Attorney, Agent, or Firm* — Ferguson Braswell Fraser Kubasta PC

(57) ABSTRACT

A method may include receiving a network schema including switches, links connecting the switches, and a topology that maps the switches to the links. The switches may include ports. The method may further include receiving a software defined networking (SDN) policy including a function that modifies a state of a packet entering a switch, converting the topology to a graph including nodes corresponding to the switches, while searching the graph, determining, according to the function, whether a port of a switch corresponding to a node is reachable by the packet entering the switch, and in response to searching the graph, verifying a property of the SDN policy.

18 Claims, 8 Drawing Sheets

(56) References Cited

OTHER PUBLICATIONS

Freire, L. et al., "Uncovering Bugs in P4 Programs with Assertion-based Verification", in Proceedings of the Symposium on SDN Research, SOSR '18, Mar. 28-29, 2018, p. 4:1-4:7 (7 pages).
Kim, H. et al., "Kinetic: Verifiable Dynamic Network Control", in Symposium on Networked Systems Design and Implementation (NSDI '15), May 4-6, 2015 (15 pages).

* cited by examiner

Revised Network Schema 400

Revised Topology 408

| Switch A 304A | Link A 306A |
| Switch A 304A | Link B 306B |
| Switch B 304B | Link B 306B |
| Switch B 304B | Link C 306C |
| Switch A 304A | Link D 306D |
| Switch B 304B | Link F 306F |
| Switch C 304C | Link D 306D |
| Switch C 304C | Link E 306E |
| Switch C 304C | Link F 306F |

| Switch 322 | Destination Address 324 | Function 326 |
|---|---|---|
| Switch A 304A | 10.0.0.1 | forward(1) |
| Switch A 304A | 10.0.0.2 | forward(2) |
| Switch B 304B | 10.0.0.1 | forward(2) |
| Switch B 304B | 10.0.0.2 | forward(1) |
| Switch A 304A | 10.0.0.3 | forward(2) |
| Switch B 304B | 10.0.0.3 | forward(2) |
| Switch C 304C | 10.0.0.3 | forward(1) |
| Switch C 304C | 10.0.0.1 | forward(3) |
| Switch C 304C | 10.0.0.2 | forward(2) |

Revised SDN Policy 420

Routing Error 450 (rows: Switch A 304A / 10.0.0.3 / forward(2) and Switch B 304B / 10.0.0.3 / forward(2))

VERIFICATION OF SOFTWARE-DEFINED NETWORKING (SDN) POLICIES FOR SPECIFIC TOPOLOGIES

BACKGROUND

Software defined networking is a networking paradigm designed to resolve some of the limitations of traditional networking by automating the network control process. Software defined networking is especially useful in large-scale networks, such as cloud-based networks, where manual analysis and reconfiguration of the network may be difficult. Although the usage of software defined networks (SDNs) reduces the likelihood of operational issues, troubleshooting of large-scale SDNs is often difficult. Thus, automation of the verification of the functionality and efficiency of an SDN is desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving a network schema including switches, links connecting the switches, and a topology that maps the switches to the links. The switches include ports. The method further includes receiving a software defined networking (SDN) policy including a function that modifies a state of a packet entering a switch, converting the topology to a graph including nodes corresponding to the switches, while searching the graph, determining, according to the function, whether a port of a switch corresponding to a node is reachable by the packet entering the switch, and in response to searching the graph, verifying a property of the SDN policy.

In general, in one aspect, one or more embodiments relate to a system including a memory coupled to a computer processor, a repository configured to store a network schema including switches, links connecting the switches, and a topology that maps the switches to the links. The switches include ports. The repository is further configured to store a software defined networking (SDN) policy including a function that modifies a state of a packet entering a switch, and a graph including nodes corresponding to the switches. The system further includes a policy checker, executing on the computer processor and using the memory, configured to determine whether a property of the function is satisfied, and a topology analyzer, executing on the computer processor and using the memory, configured to convert the topology to the graph, while searching the graph, determine, according to the function, whether a port of a switch corresponding to a node is reachable by the packet entering the switch, and in response to searching the graph, verify a property of the SDN policy.

In general, in one aspect, one or more embodiments relate to a non-transitory computer readable medium including instructions that, when executed by a computer processor, perform: receiving a network schema including switches, links connecting the switches, and a topology that maps the switches to the links. The switches include ports. The instructions further perform receiving a software defined networking (SDN) policy including a function that modifies a state of a packet entering a switch, converting the topology to a graph including nodes corresponding to the switches, while searching the graph, determining, according to the function, whether a port of a switch corresponding to a node is reachable by the packet entering the switch, and in response to searching the graph, verifying a property of the SDN policy.

Other aspects of the invention will be apparent from the following description and the appended claims.

BRIEF DESCRIPTION OF DRAWINGS

FIG. 4A, FIG. 4B, and FIG. 4C show examples in accordance with one or more embodiments of the invention.

DETAILED DESCRIPTION

Figure 1:
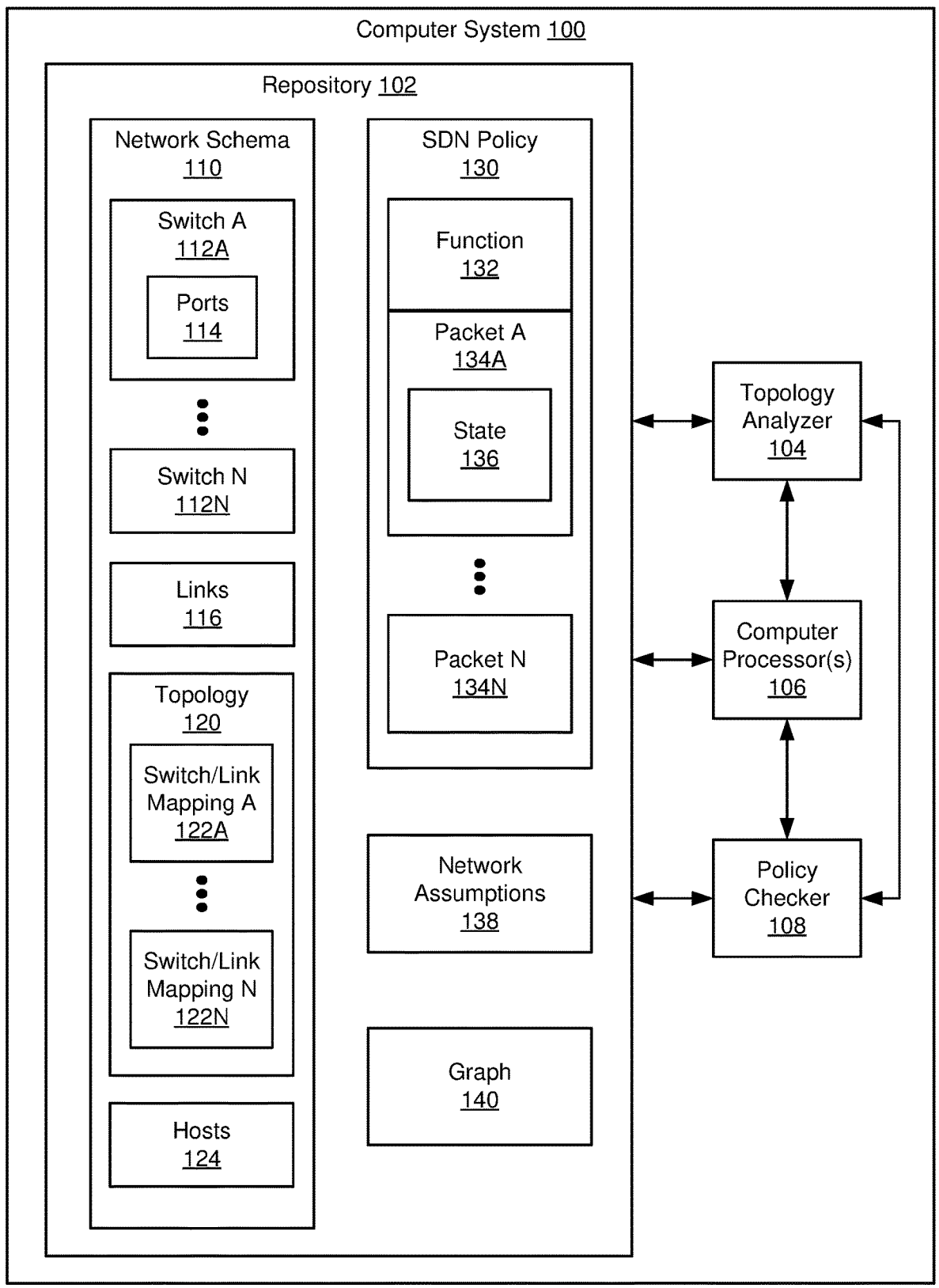
FIG. 1 shows a flow diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to verifying software defined networking (SDN) policies for network topologies. In one or more embodiments, a network schema includes a topology that maps switches to links, where each link connects a pair of switches. Each switch may include ports. In one or more embodiments, a SDN policy includes a function indicating the behavior (e.g., input-output behavior) of the policy, without specifying the implementation of the policy. The function may forward a packet entering a switch to a port of the switch. The port may be connected, via a link, to another switch. The topology may be converted to a graph whose nodes correspond to the switches. Properties of the SDN policy may be verified by determining whether a reachability property holds at the switches corresponding to the nodes of the graph. A model checker may verify the reachability property at each switch without needing to consider the full topology, thus improving the efficiency and scalability of verifying a property of the SDN policy. For example, the model checker may determine which ports of a switch are reachable, according to the SDN policy. Some examples of the properties of the SDN policy that may be verified include: determining whether a routing loop or black hole (e.g., a switch that drops all packets) exists, or whether a packet entering one switch can reach another switch.

FIG. 1 shows a computer system (100) in accordance with one or more embodiments of the invention. As shown in FIG. 1, the computer system (100) includes a repository (102), a topology analyzer (104), one or more computer processors (106), and a policy checker (108). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a network schema (110), a software defined networking (SDN) policy (130), network assumptions (138), and a graph (140). In one or more embodiments, the network schema (110) corresponds to a physical network (e.g., network (520) described with respect to FIG. 5B and the accompanying description below). In one or more embodiments, the network schema (110) includes switches (112A, 112N), links (116), a topology (120), and hosts (124). A switch (112A) may include functionality to transmit packets to other switches (112A, 112N) and/or hosts (124). For example, a switch (112A) may be a computing system (e.g., computing system (500)). A switch (112A) may include ports (114) where packets may be sent and/or received. A port (114) where a packet is received may be referred to as an input port, or inport. A port (114) from where a packet is sent may be referred to as an output port, or outport.

A link (116) may include functionality to connect a pair of switches. A pair of switches connected by a link (116) may be referred to as adjacent switches. Alternatively, a link (116) may connect a switch and a host. In one or more embodiments, the link (116) specifies a port (116) at each switch that is connected to the link (116). In one or more embodiments, the topology (120) describes the connectivity of the switches (112A, 112N) and links (116). The topology (120) may include switch/link mappings (122A, 122N). A switch/link mapping (122A) maps a switch (112A) to one or more links (116). In one or more embodiments, the hosts (124) are computing systems (e.g., computing system (500)) that are connected to switches (112A, 112N) by links (116). A host (124) may correspond to an internet protocol (IP) address.

In one or more embodiments, the SDN policy (130) specifies the behavior of one or more switches (112A, 112N). The SDN policy (130) may be represented in a format (e.g., as a C program) recognized by the policy checker (108). The SDN policy (130) may include a function (132) performed using one or more packets (134A, 134N). The function (132) may specify input/output behavior of a switch (112A) without specifying how to implement the input/output behavior. For example, a function (132) may send (e.g., forward) a packet (134A) from a sending switch to a receiving switch. Continuing this example, the function (132) may indicate the outport of the sending switch and the inport of the receiving switch.

The function (132) may be implemented as a collection of source code including various software components. The function (132) may include statements written in a programming language, or intermediate representation (e.g., byte code). The function (132) may be transformed by a compiler into binary machine code. Compiled machine code may be executed by the processor (106) in order to execute software components generated from the function (132). In one or more embodiments, the function (132) may be any collection of object code (e.g., machine code generated by a compiler) or another form of the function.

In one or more embodiments, a packet (134A) is a structured piece of data that is routed among switches (112A, 112N). A packet (134A) may have a state (136). The state (136) may be based on the values of one or more fields of the packet (134A). Examples of fields may include: destination address (e.g., a host (124) or switch (112A) that is the intended recipient of the packet (134A)), source address (e.g., a host (124) or switch (112A) that originated the packet (134A)), outport, error detection codes (e.g., checksums, parity bits), sequencing information, time to live, packet length, priority, etc.

In one or more embodiments, the behavior of the function (132) is based on the state (136) of one or more packets (134A, 134N). For example, the behavior of the function (132) may be based on the state (136) of a current packet received by a switch (112A). Alternatively, the behavior of the function (132) may be based on the state (136) of a current packet received by the network schema (110) and one or more previous packets received by a switch (112A). The function (132) may return a result including zero or more packets (134A, 134N). For example, if the function (132) multicasts (e.g., duplicates) a packet (134A), the result may contain multiple packets (134A, 134N). Alternatively, if the function (132) drops a packet (134A), the result may contain zero packets.

In one or more embodiments, the function (132) is a control plane function. The control plane may represent the "signaling" of the network schema (110) (e.g., to make decisions about where to route packets (134A, 134N)). For example, control plane packets may be originated from and/or destined to switches (112A, 112N). Alternatively, the function (132) may be a data plane function. Data plane packets may be originated from and/or destined to hosts (124), and may be transmitted through a series of switches (112A, 112N) according to control plane logic.

In one or more embodiments, one or more properties are associated with the SDN policy (130). One example of a property is whether the SDN policy (130) includes a routing loop, or is loop-free. A routing loop occurs when a single packet (134A) visits the same switch (112A) more than once. Another example of a property is whether the SDN policy (130) includes a black hole, or is black hole-free. A black hole occurs when a switch (112A) drops all packets (134A, 134N) received by the switch (112A). Yet another example of a property is whether, under the SDN policy (130), one switch is reachable by another switch. A switch is reachable by another switch when a packet (134A) entering one switch reaches the other switch as the packet (134A) is sent across a series of one or more links (116).

In one or more embodiments, the SDN policy (130) is an atomic policy that is independent of other SDN policies. In contrast, an SDN policy (130) may be a combinator policy that refers to other SDN policies. In one or more embodiments, the SDN policy (130) is a static policy that remains constant throughout the runtime of the physical network corresponding to the network schema (110). In contrast, an SDN policy (130) may be a dynamic policy that is modified based on events occurring in the physical network corresponding to the network schema (110).

In one or more embodiments, network assumptions (138) are assumptions about the state (136) of packets (134A, 134N) and/or aspects of the physical network corresponding to the network schema (110). An example of a network assumption (138) may be that the destination addresses of packets (134A, 134N) are restricted to a predetermined range of IP addresses.

In one or more embodiments, the graph (140) represents the topology (120). In one or more embodiments, the graph (140) includes nodes corresponding to the switches (112A, 112N) and/or hosts (124). The graph (140) may include edges corresponding to the links (116).

In one or more embodiments, the topology analyzer (104) may be implemented in hardware (e.g., circuitry), software, firmware, and/or any combination thereof. In one or more embodiments, the topology analyzer (104) includes functionality to convert a topology (120) to a graph (140). The topology analyzer (104) may include functionality to verify a property of an SDN policy (130) for a topology (120) of a network schema (110) (e.g., by invoking the policy checker (108) while traversing the nodes of the graph (140)).

In one or more embodiments, the policy checker (108) may be implemented in hardware (e.g., circuitry), software, firmware, and/or any combination thereof. In one or more embodiments, the policy checker (108) includes functionality to determine whether a property of a SDN policy (130) is satisfied. As an example, the policy checker (108) may be implemented using the C Bounded Model Checker (CBMC), which checks whether a program written in the C programming language satisfies an assertion.

In one or more embodiments, the computer processor (106) includes functionality to execute the topology analyzer (104) and/or the policy checker (108).

While FIG. 1 shows a configuration of components, other configurations may be used without departing from the scope of the invention. For example, various components may be combined to create a single component. As another example, the functionality performed by a single component may be performed by two or more components.

Figure 2:
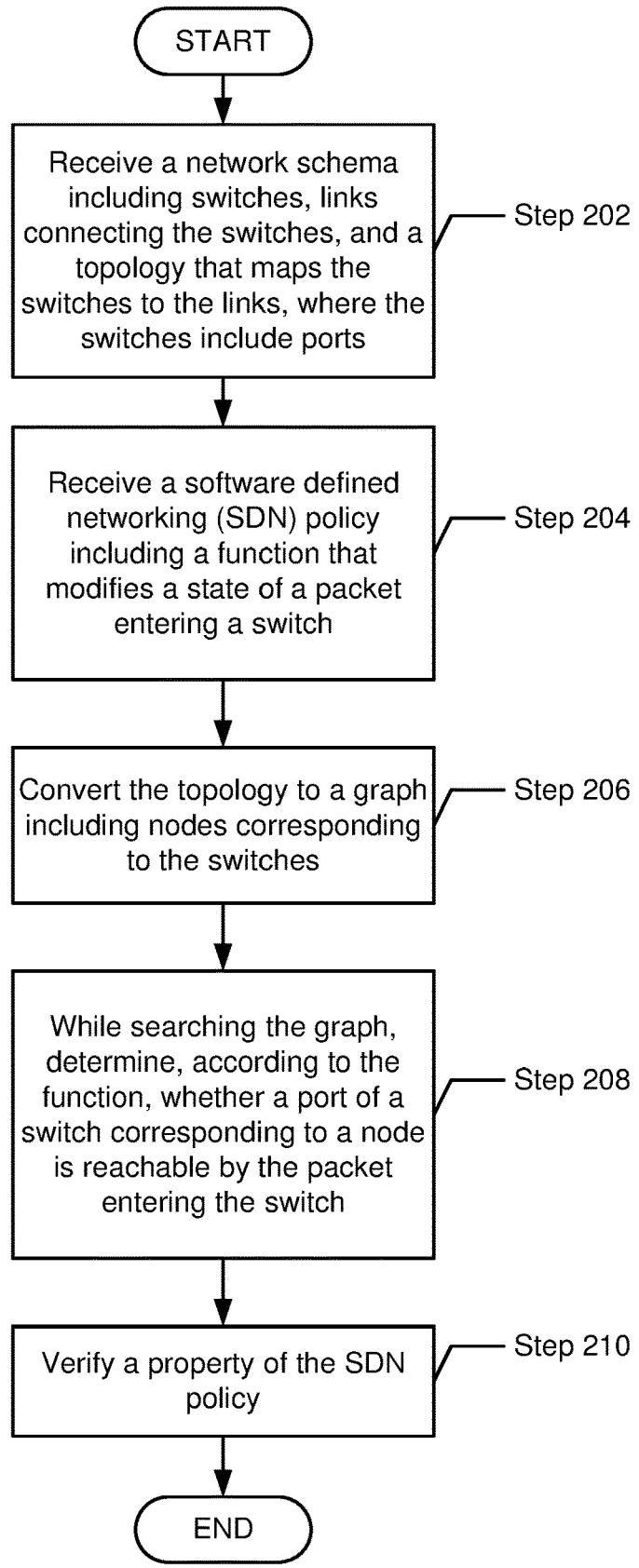
FIG. 2 shows a flowchart of a method in accordance with one or more embodiments of the invention.

FIG. 2 shows a flowchart in accordance with one or more embodiments of the invention. The flowchart depicts a process for verifying a policy for a topology. One or more of the steps in FIG. 2 may be performed by the components (e.g., the topology analyzer (104) and/or policy checker (108) of the computer system (100)), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a network schema is received. In one or more embodiments, the topology analyzer receives the network schema from a network developer or administrator. Alternatively, the topology analyzer may obtain the network schema from a repository.

In Step 204, a software defined networking (SDN) policy that includes a function is received. The topology analyzer may receive the SDN policy from a network developer or administrator. Alternatively, the topology analyzer may obtain the SDN policy from a repository. The SDN policy may be represented in a format for which a model-checking tool exists. For example, a SDN policy represented in the C programming language may be checked using the CBMC tool.

In Step 206, the topology is converted to a graph. The topology analyzer may convert the topology to the graph by:
1) adding a node corresponding to each switch of the network schema that is mapped by the topology to one or more links,
2) adding a node corresponding to each host of the network schema that is connected by a link of the network schema, and
3) adding an edge corresponding to each link included in the topology.

In Step 208, while searching the graph, it is determined whether, according to the function, a port of a switch corresponding to a node in the graph is reachable by a packet entering the switch. In one or more embodiments, determining the reachability of the port by the packet entering the switch includes determining whether the function sets the outport of the packet to the port. In one or more embodiments, the topology analyzer invokes the policy checker to determine the reachability of the port at each node of the graph visited by the topology analyzer. The topology analyzer may perform a depth-first search of the graph. In one or more embodiments, starting with a current node of the graph corresponding to a current switch, the topology analyzer adds, to a stack of nodes to be visited, nodes corresponding to switches and/or hosts that are connected, via a link, to a port of the current switch that is reachable from the current switch, according to the function of the SDN policy. In other words, the topology analyzer may search the graph by visiting nodes corresponding to switches and/or hosts that are connected, via links and in accordance with the function, to the current switch corresponding to the current node.

In one or more embodiments, before searching the graph, the topology analyzer converts the function to a format recognized by the policy checker. For example, the function may be converted to a programming language, such as the C programming language, if the CBMC model checker is used by the policy verifier.

In one or more embodiments, the destination addresses (e.g., host IP addresses) of packets are restricted to a predetermined range of IP addresses. For example, restricting the range of IP addresses may improve the efficiency of performing the reachability check.

In Step 210, in response to searching the graph, a property of the SDN policy is verified. In one or more embodiments, the topology analyzer verifies that the SDN policy is loop-free by determining that no node is visited more than once (e.g., no node is added to the stack of nodes to be visited more than once) while searching the graph. In one or more embodiments, the topology analyzer verifies that the SDN policy is black hole-free by determining that the switch corresponding to each node includes a port that is set as an output port by the function of the SDN policy.

In one or more embodiments, the topology analyzer verifies that a pair of switches are reachable by a single packet. The topology analyzer may verify, by searching the graph in a pairwise fashion, that a switch S is reachable from a non-adjacent switch T. Switch S and switch T may be non-adjacent in the sense that there is no link connecting switch S and switch T. While searching the graph (see description of Step 208 above), the topology analyzer may add, to the stack of nodes to be visited, a node N corresponding to switch T. If the topology analyzer subsequently adds, during the search of the graph, a node O corresponding to switch S, the topology analyzer determines that switch S is reachable from switch T. Alternatively, if the topology analyzer completes its search (e.g., a depth-first search) of the graph without encountering a node corresponding to switch S, the topology analyzer determines that switch S is not reachable from switch T.

FIG. 3A, FIG. 3B, FIG. 4A, FIG. 4B, and FIG. 4C show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

Figure 3A:
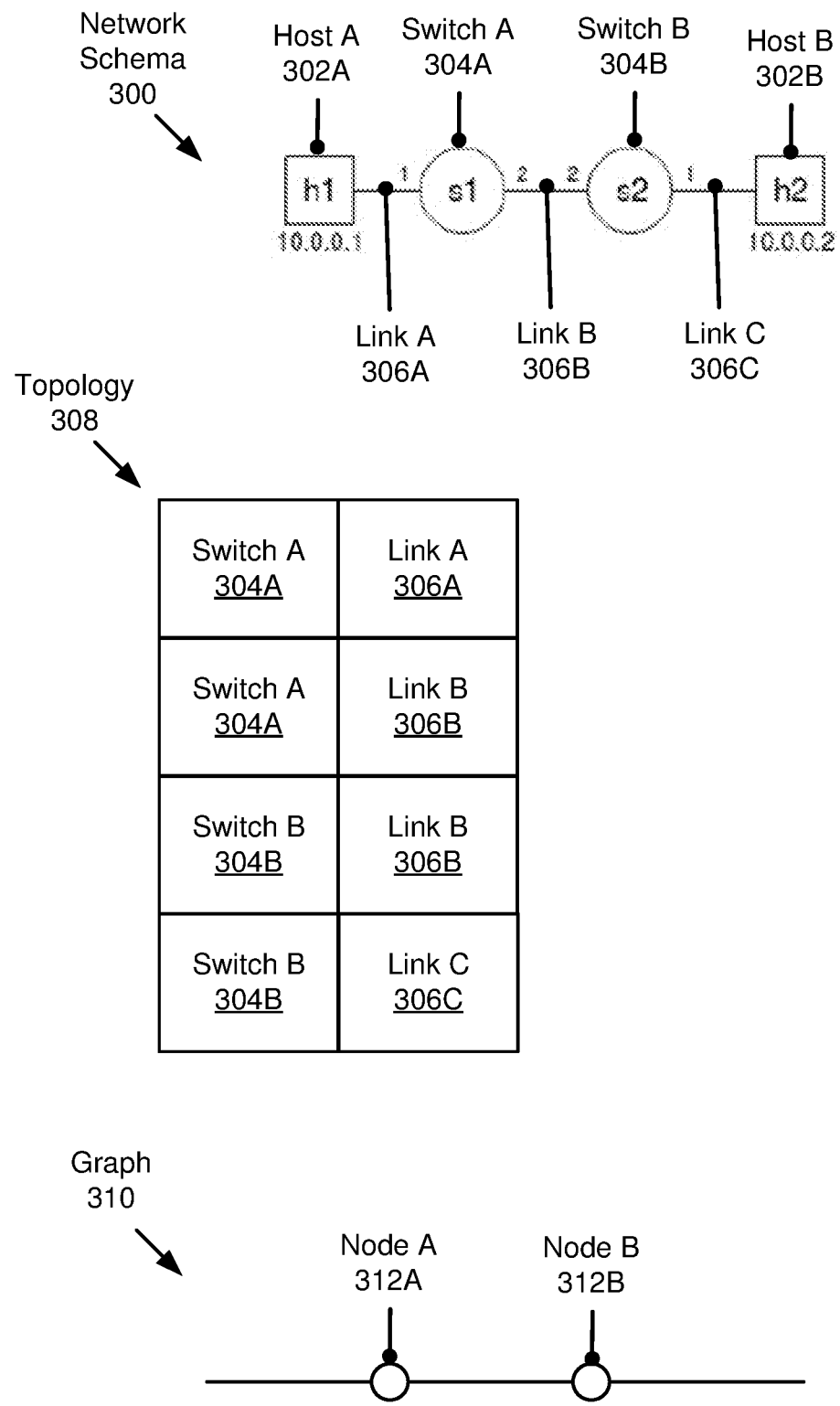
FIG. 3A and FIG. 3B show examples in accordance with one or more embodiments of the invention.

FIG. 3A shows a simple network schema (300) ((110) in FIG. 1) which includes two hosts (302A, 302B) ((124) in FIG. 1), two switches (304A, 304B) ((112A, 112N) in FIG. 1), and three links (306A, 306B, 306C) ((116) in FIG. 1). FIG. 3A also shows a topology (308) ((120) in FIG. 1) that maps the switches (304A, 304B) to the links (306A, 306B, 306C). The topology analyzer ((104) in FIG. 1) converts the topology (308) to the graph (310) ((140) in FIG. 1). The graph (310) includes nodes (312A, 312B) corresponding to the switches (304A, 304B). The nodes corresponding to the hosts (302A, 302B) are not shown.

Figure 3B:
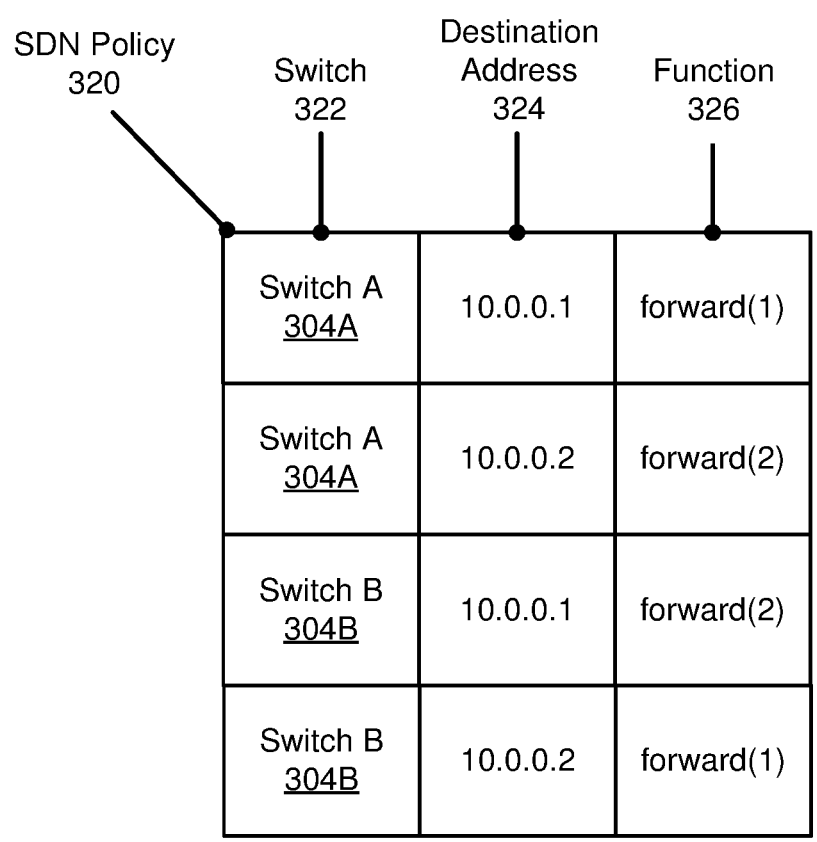

FIG. 3B shows a SDN policy (320) ((130) in FIG. 1) that indicates a function (326) to performed at a switch (322), given a destination address (324) of a packet ((134A, 134N) in FIG. 1). The SDN policy (320) indicates that switch A (304A) forwards a packet whose destination address is 10.0.0.1 (i.e., the address of host A (302A)) to port 1 of switch A (304A). As shown in FIG. 3A, port 1 of switch A (304A) is connected by link A (306A) to host A (302A), which is the destination of the packet. The SDN policy (320) also indicates that switch A (304A) forwards a packet whose destination address is 10.0.0.2 (i.e., the address of host B (302B)) to port 2 of switch A (304A). As shown in FIG. 3A, port 2 of switch A (304A) is connected by link B (306B) to switch B (304B). The SDN policy (320) also indicates that switch B (304B) forwards a packet whose destination address is 10.0.0.1 (i.e., the address of host A (302A)) to port 2 of switch B (304B). As shown in FIG. 3A, port 2 of switch B (304B) is connected by link B (306B) to switch A (304A). The SDN policy (320) also indicates that switch B (304B) forwards a packet whose destination address is 10.0.0.2 (i.e., the address of host B (302B)) to port 1 of switch B (304B). As shown in FIG. 3A, port 1 of switch B (304B) is connected by link C (306C) to host B (302B), which is the destination of the packet.

The topology analyzer attempts to verify, by searching the graph (310), whether, according to the SDN policy (320), switch B (304B) is reachable by a packet entering switch A (304A). The topology analyzer begins its search at node A (312A), which corresponds to switch A (304A). The topology analyzer invokes the policy checker ((108) in FIG. 1) to determine whether the functions of the SDN policy (320) set the outport of the packet entering switch A (304A) to a port of switch A (304A). The policy checker determines that, according to the SDN policy (320), when the destination address of the packet is 10.0.0.1, the packet will be sent to port 1 of switch A (304A), which is connected, via link A (306A), to host A (302A). And according to the SDN policy (320), when the destination address of the packet is 10.0.0.2, the packet will be sent to port 2 of switch A (304A), which is connected, via link B (306B), to switch B (304B). Thus, the topology analyzer concludes that switch B (304B) is reachable by a packet entering switch A (304A). The topology analyzer performs a similar analysis to determine that switch A (304A) is reachable by a packet entering switch B (304B).

Figure 4A:
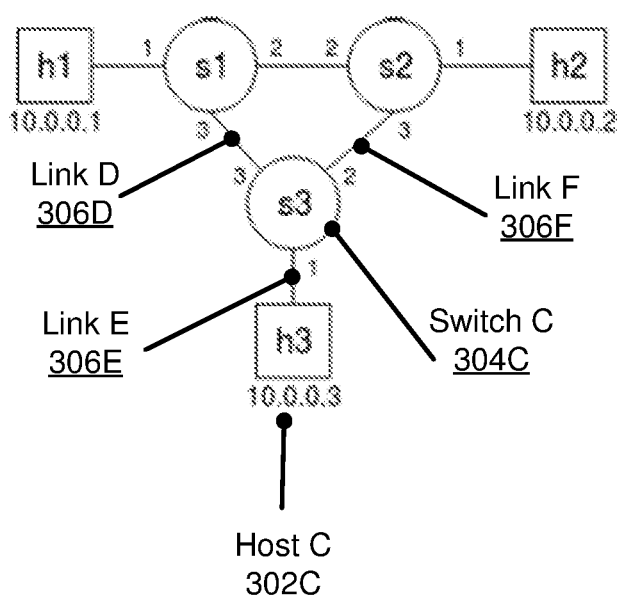
Figure 4B:
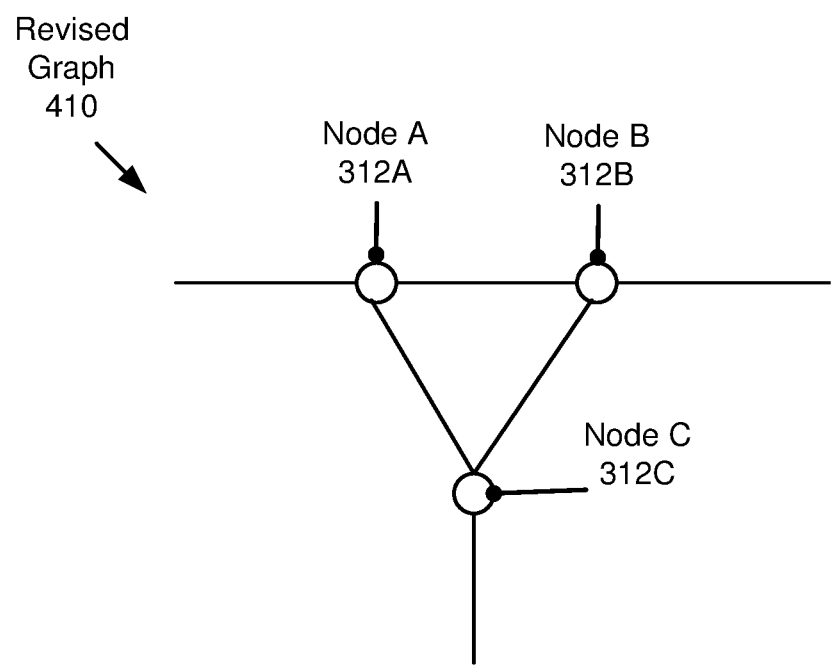

FIG. 4A shows a revised network schema (400) which adds a new host (302C), a new switch (304C), and three new links (306D, 306E, 306F). FIG. 4A also shows a revised topology (408) that maps the switches (304A, 304B, 304C) to the links (306A, 306B, 306C, 306D, 306E, 306F). The topology analyzer converts the revised topology (408) to the revised graph (410) shown in FIG. 4B. The revised graph (410) includes nodes (312A, 312B, 312C) corresponding to the switches (304A, 304B, 304C). The nodes corresponding to the hosts (302A, 302B, 302C) are not shown.

FIG. 4C shows a revised SDN policy (420) that augments the SDN policy shown in FIG. 3B. The revised SDN policy (420) indicates that switch A (304A) forwards a packet whose destination address is 10.0.0.3 (i.e., the address of host C (302C)) to port 2 of switch A (304A). As described above, port 2 of switch A (304A) is connected by link B (306B) to switch B (304B). The revised SDN policy (420) also indicates that switch B (304B) forwards a packet whose destination address is 10.0.0.3 (i.e., the address of host C (302C)) to port 2 of switch B (304B). As described above, port 2 of switch B (304B) is connected by link B (306B) to switch A (304A).

In addition, the revised SDN policy (420) includes entries corresponding to the new switch C (304C). The revised SDN policy (420) indicates that switch C (304C) forwards a packet whose destination address is 10.0.0.3 (i.e., the address of host C (302C)) to port 1 of switch C (304C). As shown in FIG. 4A, port 1 of switch C (304C) is connected by link E (306E) to host C (302C), which is the destination of the packet. The revised SDN policy (420) also indicates that switch C (304C) forwards a packet whose destination address is 10.0.0.1 (i.e., the address of host A (302A)) to port 3 of switch C (304C). As shown in FIG. 4A, port 3 of switch C (304C) is connected by link D (306D) to switch A (304A). The revised SDN policy (420) also indicates that switch C (304C) forwards a packet whose destination address is 10.0.0.2 (i.e., the address of host B (302B)) to port 2 of switch C (304C). As shown in FIG. 4A, port 2 of switch C (304C) is connected by link F (306F) to switch B (304B).

The topology analyzer attempts to verify, by searching the revised graph (410), whether, according to the SDN policy (320), switch C (304C) is reachable by a packet entering switch A (304A). The topology analyzer begins its search at node A (312A), which corresponds to switch A (304A). The topology analyzer invokes the policy checker to determine whether the functions of the revised SDN policy (420) set the outport of the packet entering switch A (304A) to a port of switch A (304A). As described above, the policy checker determines that, according to the revised SDN policy (420), when the destination address of the packet is 10.0.0.1, the packet will be sent to port 1 of switch A (304A), which is connected, via link A (306A), to host A (302A). According to the SDN policy (320), when the destination address of the packet is either 10.0.0.2 or 10.0.0.3, the packet will be sent to port 2 of switch A (304A), which is connected, via link B (306B), to switch B (304B). The topology analyzer then continues its search of the revised graph (410) at node B (412B), which corresponds to switch B (304B). Note that the revised SDN policy (420) did not permit a packet entering switch A (304A) to reach switch C (304C) directly via a link (e.g., link D (306D)) that connects both switch A (304A) and switch C (304C).

The topology analyzer invokes the policy checker to determine whether the functions of the revised SDN policy (420) set the outport of the packet entering switch B (304B) to a port of switch B (304B). The policy checker determines that, according to the revised SDN policy (420), when the destination address of the packet is either 10.0.0.1 or 10.0.0.3, the packet will be sent to port 2 of switch B (304B), which, as described above, is connected, via link B (306B), to switch A (304A). And according to the revised SDN policy (420), when the destination address of the packet is 10.0.0.2, the packet will be sent to port 1 of switch B (304B), which, as described above, is connected, via link C (306C), to host B (302B). The topology analyzer then continues its search of the revised graph (410) at node A (412A), which corresponds to switch A (304A). Note that the revised SDN policy (420) did not permit a packet entering switch B (304B) to reach switch C (304C) directly via a link (e.g., link F (306F)) that connects both switch B (304B) and switch C (304C).

The topology analyzer then detects a routing loop, since node A (412A) has already been visited by the topology analyzer. This is due to a routing error (450) in the revised SDN policy (420) where switch A (304A) and switch B (304B) send the packet back and forth to each other when the destination address is 10.0.0.3 (i.e., the IP address of host C (302C)). Furthermore, since the topology analyzer has now searched the entire revised graph (410) without encountering switch C (304C), the topology analyzer concludes that that switch C (304C) is not reachable by a packet entering switch A (304A). The topology analyzer performs a similar analysis to determine that switch C (304C) is not reachable by a packet entering switch B (304B).

Figure 5A:
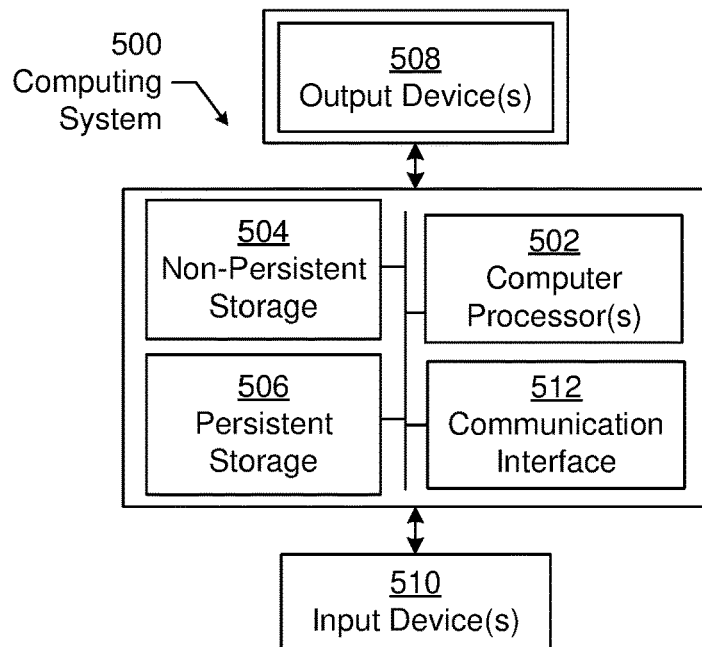
FIG. 5A and FIG. 5B show a flow diagram of computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
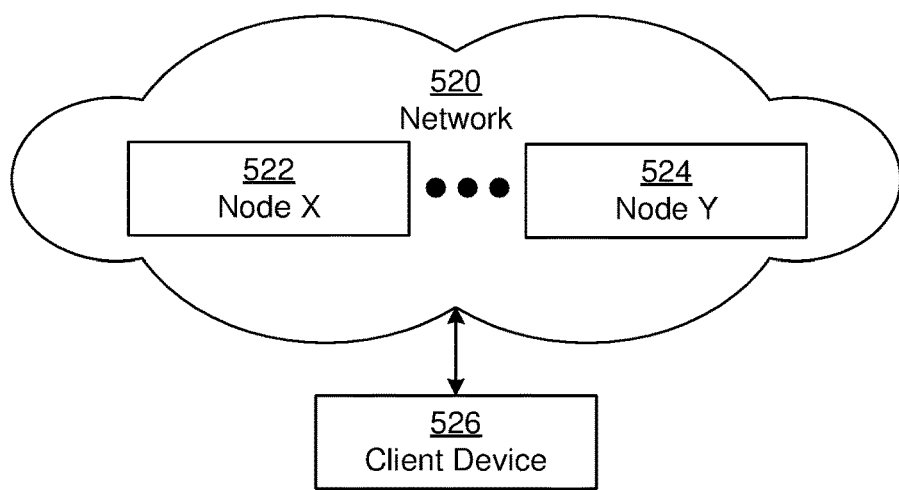

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (e.g., database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method, comprising:
receiving a network schema comprising a plurality of switches, a plurality of links connecting the plurality of switches, and a topology that maps the plurality of switches to the plurality of links, wherein the plurality of switches comprises a plurality of ports and a pair of non-adjacent switches comprising a sending switch and a receiving switch;
receiving a software defined networking (SDN) policy comprising a function that modifies a state of a first packet entering a first switch of the plurality of switches, wherein the function is implemented as a collection of source code;
converting the topology to a graph comprising a plurality of nodes corresponding to the plurality of switches;
converting the function to a source code format of a programming language recognized by a policy checker that checks whether a collection of source code satisfies an assertion;
after converting the function to the source code format by the policy checker and while searching the graph, determining, by the policy checker, that the pair of non-adjacent switches is reachable by a second packet by:
determining that a series of ports of a series of switches of the plurality of switches are reachable by the second packet entering the sending switch of the pair of non-adjacent switches by applying, at each switch in the series of switches, the function of the SDN policy to set an outport of the second packet, wherein the series of switches begins with the sending switch of the pair of non-adjacent switches and ends with the receiving switch of the pair of non-adjacent switches, and
determining that the series of ports of the series of switches is connected via a series of links of the plurality of links; and
in response to determining that the pair of non-adjacent switches is reachable by the second packet, verifying a property of the SDN policy.

2. The method of claim 1, wherein the property is whether the SDN policy is loop-free, the method further comprising determining that no node is visited more than once while searching the graph.

3. The method of claim 1,
wherein the property is whether the SDN policy is black hole-free,
the method further comprising determining that the plurality of switches each comprise a port that is set as the outport of the second packet by the function.

4. The method of claim 1,
wherein the state of the first packet comprises a destination address, and
wherein determining that the pair of non-adjacent switches is reachable by the second packet comprises determining whether a destination address of the second packet is within a range of addresses.

5. The method of claim 1, wherein the SDN policy is a combinator policy that refers to at least one other SDN policy.

6. The method of claim 1, wherein the function modifies the state of the first packet based on a state of a previous packet received by the first switch.

7. A system, comprising:
a memory coupled to a computer processor;
a repository configured to store:
a network schema comprising a plurality of switches, a plurality of links connecting the plurality of switches, and a topology that maps the plurality of switches to the plurality of links, wherein the plurality of switches comprises a plurality of ports and a pair of non-adjacent switches comprising a sending switch and a receiving switch,
a software defined networking (SDN) policy comprising a function that modifies a state of a first packet entering a first switch of the plurality of switches, wherein the function is implemented as a collection of source code, and
a graph comprising a plurality of nodes corresponding to the plurality of switches;
a policy checker, executing on the computer processor and using the memory, configured to determine whether a collection of source code satisfies an assertion; and
a topology analyzer, executing on the computer processor and using the memory, configured to:
convert the topology to the graph;
convert the function to a source code format of a programming language recognized by the policy checker;
after converting the function to the source code format by the policy checker and while searching the graph, determine, by the policy checker, that the pair of non-adjacent switches is reachable by a second packet by:
determining that a series of ports of a series of switches of the plurality of switches are reachable by the second packet entering the sending switch of the pair of non-adjacent switches by invoking the policy checker, at each switch in the series of switches, to apply the function of the SDN policy to set an outport of the second packet, wherein the series of switches begins with the sending switch of the pair of non-adjacent switches and ends with the receiving switch of the pair of non-adjacent switches, and determining that the series of ports of the series of switches is connected via a series of links of the plurality of links; and
in response to determining that the pair of non-adjacent switches is reachable by the second packet, verify a property of the SDN policy.

8. The system of claim 7,
wherein the property is whether the SDN policy is loop-free, and
wherein the topology analyzer is further configured to determine that no node is visited more than once while searching the graph.

9. The system of claim 7,
wherein the property is whether the SDN policy is black hole-free, and
wherein the topology analyzer is further configured to determine that the plurality of switches each comprise a port that is set as the outport of the second packet by the function.

10. The system of claim 7,
wherein the state of the first packet comprises a destination address, and
wherein determining that the pair of non-adjacent switches is reachable by the second packet comprises:
determining whether a destination address of the second packet is within a range of addresses.

11. The system of claim 7, wherein the SDN policy is a combinator policy that refers to at least one other SDN policy.

12. The system of claim 7, wherein the function modifies the state of the first packet based on a state of a previous packet received by the first switch.

13. A non-transitory computer readable medium comprising instructions that, when executed by a computer processor, perform:
receiving a network schema comprising a plurality of switches, a plurality of links connecting the plurality of switches, and a topology that maps the plurality of switches to the plurality of links, wherein the plurality of switches comprises a plurality of ports and a pair of non-adjacent switches comprising a sending switch and a receiving switch;
receiving a software defined networking (SDN) policy comprising a function that modifies a state of a first packet entering a first switch of the plurality of switches, wherein the function is implemented as a collection of source code;
converting the topology to a graph comprising a plurality of nodes corresponding to the plurality of switches;
converting the function to a source code format of a programming language recognized by a policy checker that checks whether a collection of source code satisfies an assertion;
after converting the function to the source code format by the policy checker and while searching the graph, determining, by the policy checker, that the pair of non-adjacent switches is reachable by a second packet by:
determining that a series of ports of a series of switches of the plurality of switches are reachable by the second packet entering the sending switch of the pair of non-adjacent switches by applying, at each switch in the series of switches, the function of the SDN policy to set an outport of the second packet, wherein the series of switches begins with the sending switch of the pair of non-adjacent switches and ends with the receiving switch of the pair of non-adjacent switches, and determining that the series of ports of the series of switches is connected via a series of links of the plurality of links; and in response to determining that the pair of non-adjacent switches is reachable by the second packet, verifying a property of the SDN policy.

14. The non-transitory computer readable medium of claim 13, wherein the property is whether the SDN policy is loop-free, and wherein the instructions further perform determining that no node is visited more than once while searching the graph.

15. The non-transitory computer readable medium of claim 13, wherein the property is whether the SDN policy is black hole-free, and wherein the instructions further perform determining that the plurality of switches each comprise a port that is set as the outport of the second packet by the function.

16. The non-transitory computer readable medium of claim 13, wherein the state of the first packet comprises a destination address, and wherein determining that the pair of non-adjacent switches is reachable by the second packet comprises: determining whether the destination address of the second packet is within a range of addresses.

17. The non-transitory computer readable medium of claim 13, wherein the SDN policy is a combinator policy that refers to at least one other SDN policy.

18. The non-transitory computer readable medium of claim 13, wherein the function modifies the state of the first packet based on a state of a previous packet received by the first switch.

* * * * *